United States Patent
Chuang et al.

(10) Patent No.: US 10,477,203 B2
(45) Date of Patent: Nov. 12, 2019

(54) METHOD AND APPARATUS FOR PALETTE TABLE PREDICTION

(71) Applicant: HFI Innovation Inc., Zhubei, Hsinchu County (TW)

(72) Inventors: Tzu-Der Chuang, Zhubei (TW); Wang-Lin Lai, San Jose, CA (US); Yu-Chen Sun, Keelung (TW); Shan Liu, San Jose, CA (US); Xiaozhong Xu, Fremont, CA (US)

(73) Assignee: HFI Innovation Inc., Zhubei, Hsinchu County (TW)

( * ) Notice: Subject to any disclaimer, the term of this patent is extended or adjusted under 35 U.S.C. 154(b) by 201 days.

(21) Appl. No.: 15/105,151

(22) PCT Filed: Dec. 18, 2014

(86) PCT No.: PCT/CN2014/094234
§ 371 (c)(1),
(2) Date: Jun. 16, 2016

(87) PCT Pub. No.: WO2015/090217
PCT Pub. Date: Jun. 25, 2015

(65) Prior Publication Data
US 2016/0316199 A1 Oct. 27, 2016

Related U.S. Application Data

(60) Provisional application No. 61/952,932, filed on Mar. 14, 2014, provisional application No. 61/922,131, (Continued)

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/136* (2014.11); *H04N 19/157* (2014.11);
(Continued)

(58) Field of Classification Search
USPC ....................... 375/240.01–240.29
See application file for complete search history.

(56) References Cited

U.S. PATENT DOCUMENTS 6,570,626 B1 * 5/2003 Mendenhall ....... H04N 5/44504
345/600
9,654,777 B2 * 5/2017 Guo ................. H04N 19/50
(Continued)

FOREIGN PATENT DOCUMENTS

| CN | 101068352 | 11/2007 |
|---|---|---|
| CN | 101217668 | 7/2008 |

(Continued)

OTHER PUBLICATIONS

Sullivan, Gary et al. Overview of the High Efficiency Video Coding (HEVC) Standard. IEEE. 2012. (Year: 2012).*
(Continued)

*Primary Examiner* — Farzana Hossain
(74) *Attorney, Agent, or Firm* — Oblon, McClelland, Maier & Neustadt, L.L.P.

(57) ABSTRACT

A method for palette coding is disclosed. In an encoder side, the method determines whether a first block is coded using a palette coding mode or a non-palette coding. If the first block is coded using the non-palette coding mode, a first color table for the first block is derived based on one or more color tables associated with one or more previously processed blocks. If the first block is coded using the palette coding mode, the first color table is derived from the first block. A second block coded after the first block may use the first color table as a palette prediction. At the decoder side, if the current block is coded using the palette coding mode, a first color table based on a previous coded block is derived and the current block is decoded using a first color table as a palette predictor.

24 Claims, 4 Drawing Sheets

Related U.S. Application Data filed on Dec. 31, 2013, provisional application No. 61/921,152, filed on Dec. 27, 2013, provisional application No. 61/917,474, filed on Dec. 18, 2013.

(51) Int. Cl.
*H04N 19/196* (2014.01)
*H04N 19/593* (2014.01)
*H04N 19/157* (2014.01)
*H04N 19/136* (2014.01)
*H04N 19/186* (2014.01)

(52) U.S. Cl.
CPC ......... *H04N 19/176* (2014.11); *H04N 19/186* (2014.11); *H04N 19/196* (2014.11); *H04N 19/593* (2014.11)

(56) References Cited

U.S. PATENT DOCUMENTS

| | | | |
|---|---|---|---|
| 2003/0202602 A1 | 10/2003 | Apostolopoulos et al. | |
| 2004/0151372 A1 | 8/2004 | Reshetov et al. | |
| 2007/0206682 A1 | 9/2007 | Hamilton et al. | |
| 2010/0046628 A1 | 2/2010 | Bhaskaran et al. | |
| 2011/0110416 A1 | 5/2011 | Lawrence | |
| 2011/0280307 A1 | 11/2011 | MacInnis et al. | |
| 2015/0016501 A1* | 1/2015 | Guo | G06T 9/00 375/240.02 |
| 2015/0146976 A1* | 5/2015 | Ma | H04N 1/646 382/166 |
| 2016/0309172 A1* | 10/2016 | Laroche | H04N 19/593 |

FOREIGN PATENT DOCUMENTS

| | | | | |
|---|---|---|---|---|
| CN | 103248893 | | 8/2013 | |
| EP | 0 800 150 | | 3/1997 | |
| GB | 2521410 | * | 6/2015 | .......... H04N 19/463 |
| WO | WO 2013/069216 | | 5/2013 | |

OTHER PUBLICATIONS

"AHG8 Major-color-based screen content coding;" Sep. 2016; pp. 1-8.

Guo, L., et al.; "Palette Mode for Screen Content Coding;" Joint Collaborative Team on Video Coding (JCT-VC) of ITU-T SG 16 WP 3 and ISO/IEC JTC 1/SC 29/WG 11; Apr. 2013; pp. 1-5.

Zhu, W., et al.; "Template-based palette prediction;" Joint Collaborative Team on Video Coding (JCT-VC) of ITU-T SG 16 WP 3 and ISO/IEC JTC 1/SC 29/WG 11; Apr. 2013; pp. 1-7.

International Search Report dated Mar. 24, 2015, issued in application No. PCT/CN2014/094251.

International Search Report dated Mar. 24, 2015, issued in application No. PCT/CN2014/094234.

* cited by examiner ically, the present invention relates to techniques
METHOD AND APPARATUS FOR PALETTE TABLE PREDICTION

CROSS REFERENCE TO RELATED APPLICATIONS

The present invention claims priority to U.S. Provisional Patent Application, Ser. No. 61/917,474, filed on Dec. 18, 2013, U.S. Provisional Patent Application, Ser. No. 61/921, 152, filed on Dec. 27, 2013, U.S. Provisional Patent Application, Ser. No. 61/922,131, filed on Dec. 31, 2013 and U.S. Provisional Patent Application, Ser. No. 61/952,932, filed on Mar. 14, 2014. The U.S. Provisional Patent Applications are hereby incorporated by reference in their entireties.

FIELD OF THE INVENTION

The present invention relates to palette coding for video data. In particular, the present invention relates to techniques to improve the performance by developing more efficient palette sharing.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the palette coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the palette coding becomes very effective for screen content materials.

Therefore, it is desirable to develop methods for further improving the coding efficiency and/or reducing the complexity associated with the palette coding.

BRIEF SUMMARY OF THE INVENTION

A method for coding a block of video data using palette coding in a video coding system is disclosed. In an encoder side, the method determines whether a first block is coded using a palette coding mode or a non-palette coding. If the first block is coded using the non-palette coding mode, a first color table for the first block is derived based on one or more color tables associated with one or more previously processed blocks. If the first block is coded using the palette coding mode, the first color table is derived from the first block. The first color table is stored and used by a subsequent block for palette coding. Therefore, if a second block after the first block is determined to use the palette coding mode, the second block may use the first color table as a palette prediction. The first block may correspond to the last coded block of the second block. For example, the palette coding for the second block may rely on the first color table of a previously processed block as a palette predictor.

If the first block is coded using the non-palette coding mode, the first color table for the first block may be derived from a neighboring color table of an above block, a left block or any previously coded neighboring block of the first block. The first color table may also correspond to a last coded color table. The first color table can stay in the buffer unchanged if the second block is a first following block or a first neighboring block of the first block and the second block is coded using the non-palette coding mode. Furthermore, the first color table can stay in the buffer unchanged again if a second following block following the first following block is also coded using the non-palette coding mode. The first block may be located at a left side of the second block. If the second block corresponds to a following block after the first block and the second block is coded in the palette coding mode, then a coded color table of the second block can be stored in the buffer to update one or more stored color tables. If the second block is determined to use the palette coding mode and if a first neighboring block or a first following block in coding order of the second block used to derive a neighboring palette predictor is coded in the non-palette coding mode or unavailable, then the first color table stored in the buffer can be used as the palette predictor for said applying palette coding to the second block.

If the second block is determined to use the palette coding mode and if a first previous coded block of the second block used to derive a first palette predictor is coded in the non-palette coding mode or unavailable, then the color table of a second previous coded block coded in the palette coding mode can be used as the color table of the first neighboring block for said applying palette coding to the second block. The first block and the second block can be in a same coding tree unit (CTU) or in a same CTU row. The second block may copy the palette predictor corresponding to the first color table as the color table of the second block on an entry by entry basis or copy it entirely. The second block may derive the palette predictor based on a single neighboring color table associated with a left side block of the second block, and the second block may use the first color table or one previously coded color table if the left side block of the second block is coded in non-palette coding mode or is unavailable.

In a decoder side, the system determines whether the current block is coded in a palette coding mode or a non-palette coding mode. If the current block is coded using the palette coding mode, a first color table is derived based on a previous coded block of the current block and the current block is decoded using a first color table stored in a buffer as a palette predictor. The current block may copy the palette predictor corresponding to the first color table as a current color table of the current block on an entry by entry basis or copy it entirely.

A method of coding a block of video data using palette coding according to a reference color table is also disclosed. A reference color table is selected from the palette book consisting of one or more stored color tables. If a palette coding mode is selected for the current block, palette coding is applied to the current block using the reference color table selected as a palette predictor of the current block. The reference color table may correspond to a last coded color table. The reference color table can be used entry by entry, or used entirely. If the non-palette coding mode is selected for the current block, the palette book will not be updated. If the palette coding mode is selected for the current block, an encoded or decoded current color table of the current block can be checked for updating the palette book. The encoded or decoded current color table of the current block can replace an oldest stored color table. A book index can be used to identify the reference color table selected from the palette book. The book index may have a smaller value for a more recent stored color table in the palette book. The book index may be inferred if the palette book contains only one color table.

DETAILED DESCRIPTION OF THE INVENTION

Figure 1:
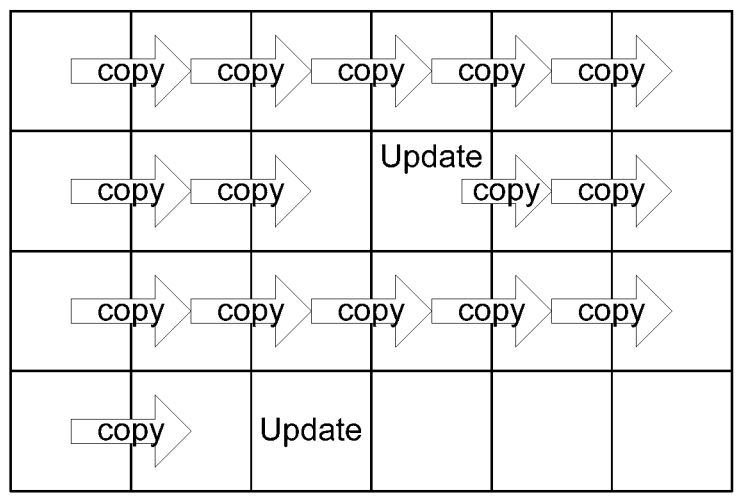
FIG. 1 illustrates an example of palette table management, where the palette table is stored in a block level and may be copied from block to block.

In the present invention, various techniques to improve the performance of palette coding. In related art, when a block (e.g., a coding unit (CU)) is not coded in a palette mode, the color table will be reset to zero or set as not available. Therefore, no palette information can be used by following blocks for palette prediction. In order to improve performance, an embodiment of the present invention saves or stores one or more color tables for the non-palette coded CU. The color table for this non-palette coded block can be derived from a coded color table and considered as the color table of this non-palette coded block. Therefore, the color table for a non-palette coded block is "derived" and used for palette prediction of another block. For example, the last coded color table or the color table from a left or an above block can be used as the color table of the non-palette coded block. The color table derived for the non-palette coded block is also referred as a "derived" color table in this disclosure. These saved or stored color tables can be referenced by the neighboring blocks or the following blocks in coding order for color table coding or can be the reference color table for a non-palette coded neighboring block or the following block in coding order.

In one example, a non-palette coded CU may use the color table from its left block as its color table. This color table, i.e., a "derived" color table, can be used for color table prediction for the neighboring blocks. This color table can be also propagated to the neighboring blocks as their color table if the neighboring blocks are not coded in the palette mode.

In another example, a non-palette coded CU may use the color table of the last coded block as its color table. This color table can be used for color table prediction for the neighboring blocks or the following blocks in coding order. This color table can also be propagated to the neighboring blocks or the following blocks in coding order as their color table if the neighboring blocks or the following blocks in coding order are not coded in the palette mode.

In yet another example, a non-palette coded CU may use the color table of the neighboring block as its color table if the neighboring block is coded in the palette mode. Otherwise, the non-palette coded CU uses the color table of the neighboring block that is not coded in palette mode. For example, a color table priority can be adopted such as: using the left color table if the left block is coded in palette mode; otherwise, using above color table if above block is coded in palette mode; and if none of the above, using the left color table where the left block is a non-palette coded block. This color table can be used for color table prediction for the neighboring blocks. This color table can be also propagated to the neighboring blocks as their color table if they are not coded in the palette mode.

When the color table of a CU is determined to be coded in the palette mode, it will take the neighboring color table as the palette predictor. When the neighboring block is not coded in the palette mode, the stored color table can be used as the palette predictor. In another example, if the neighboring block is not coded in the palette mode or not available, the color table of another neighboring block or the color table of the last coded block will be used and replaces the color table of a corresponding neighboring block.

In order to reduce the line buffer requirement, the color table in the upper CTU row can be treated as unavailable and replaced by a default color table (e.g. all zero). Alternatively, the color table can be replaced by the color table of the left block or the last coded block. The color table reuse and propagation may also be limited to within a CTU or a CTU row. Therefore, there is no need to store the derived color table across CTUs or across CTU rows.

To improve coding efficiency, if one of the neighboring block is not available or is not coded in the palette mode, the color table of one of the remaining neighboring blocks that is coded in the palette mode can be used to replace the color table of the neighboring block. For example, if the left block is not coded in the palette mode and however the above block is coded in the palette mode, the color table of the left block can be replaced by the color table of the above block.

While the current CU may use the color table from either the left block or the above block as its color table, it may also restrict the current CU to only use the color table from the left CU as its color table. Therefore, there will be no need to store the color tables associated with an upper CU row. The color table reuse technique will use the color table of the left block as its derived color table if the current CU is a non-palette coded block. This derived color table can be used as the reference color table for the neighboring or following CU of the current CU.

While above embodiments disclose techniques to reuse a color table from previously processed color table for a non-palette coded block, in another embodiment, the color table of the last coded block is used as the color table predictor for color table coding. If the last coded block is coded in the palette mode, the color table is updated by the new color table of the last coded block. If the last coded block is not coded in the palette mode, it will keep the color table of the previous last coded block unchanged. In other words, if the last coded block is not coded in palette mode, the saved color table will not be updated. This color table of the last coded block can be referred as the palette predictor for the color table coding of the following blocks.

The color table prediction can be applied on the basis of entry by entry prediction. In this case, each corresponding element of the current color table is predicted by the corresponding element of the palette predictor in the stored color table. The color table prediction can also copy the entire color table. In this case, the entire current color table may be coded from the palette predictor in the stored color table.

Another type of embodiment of the present invention keeps one or more derived color tables in a palette book and selects a color table from the palette book for palette prediction. Various means can be used to generate the palette book. For example, a history of the recently encoded palette tables can be stored in a "palette book". The current CU may choose one of the palette tables stored in the palette book as indicated by book index as the color table predictor. The color table prediction can be applied on the basis of entry by entry prediction. In this case, each corresponding element of the current color table is predicted by the corresponding element of the palette predictor in the stored color table. The color table prediction can also copy the entire color table. In this case, the entire current color table may be coded from the palette predictor in the stored color table. If the current CU is coded in palette mode, the current palette will replace one color table in the palette book. The new palette is encoded and transmitted to the decoder so that the same palette book updating process can be carried out in the same way at both the encoder and the decoder.

There are various ways to update and order the previously coded palette sets. In one particular example, the palette tables, also referred as palette sets, are simply ordered based on their coding order, i.e. the most recently coded palette is stored at the beginning of the "palette book" (i.e., having a smallest index), while the older ones are stored afterwards (i.e., having larger indices). For example, a palette book with size KK is used to store KK sets of previously coded palettes. When a new palette set is being coded, entries 1 to (KK-1) in the "palette book" will be moved to entries 2 through KK in order to make the first entry available for the newly coded palette. This is simply a first-in-first-out updating and ordering process. Various examples of "palette book" based palette coding are illustrated as follows.

CU-wise control of palette sharing using "palette book". The following pseudo-code demonstrates an example of palette sharing using a palette book when the sharing is controlled on a CU-wise basis (i.e., sharing for all color components). The embodiment may also be used for triplet palette format as disclosed in JCTVC-N-0249.

```
If (palette_pred)
    Parse syntax book_index
    For (color_index)
        Current CU palette[color_index] = palette_book[book_index]
        [color_index]
    End
Else
    For (color_index)
        Parse syntax num_major_color[color_index]
        For (k<=KK, k>1, k--)
            palette_book[k][color_index] = palette_book[k-1]
            [color_index]
        End
        For (n <= num_major_color[color_index])
            Parse syntax for current CU palette[color_index][n]
            palette_book[0][color_index][n] = current CU
            palette[color_index][n]
        End
    End
End
```

In the above pseudo code, when palette prediction is used as indicated by palette_pred being 1, a palette book index (i.e., book_index) is determined from the bit stream. The palette for the current CU (i.e., Current CU palette[color_index]) is derived from the palette book having book index (i.e., palette_book[book_index][color_index]). If the current CU does not use palette prediction, entries 1 to (KK-1) in the "palette book" will be moved to entries 2 through KK in order to make the first entry available for the newly coded palette (i.e., palette_book[k][color_index]=palette_book[k-1][color_index] for (k<=KK, k>1, k - - - )). The newly parsed current CU palette (i.e., Parse syntax for current CU palette[color_index][n]) will be placed in the leading palette book (i.e., palette_book[0][color_index][n]= current CU palette[color_index][n]).

Component-wise control of palette sharing using "palette book". The fifth embodiment is similar to the fourth embodiment except that the sharing control is component-wise. An exemplary pseudo code according to this embodiment is shown below for each color component.

```
For (color_index)
    If (palette_pred[color_index])
        Parse syntax book_index[color_index]
        palette[color_index] = palette_book[ book_index[color_index] ]
        [color_index]
    Else
        Parse syntax num_major_color[color_index]
        For (k<=KK, k>1, k--)
            palette_book[k][color_index] = palette_book[k-1][color_index]
        End
        For (n <= num_major_color[color_index])
            Parse syntax for current CU palette[color_index][n]
            palette_book[0][color_index][n] = current CU
            palette[color_index][n]
        End
    End
End
```

Luma/Chroma-wise control of palette sharing using "palette book". While CU-wise and component-wise palette sharing control using "palette book" are shown in the fourth and fifth embodiments respectively, the sharing control of palette book may also be luma/chroma wise. The luma component and the chroma components may have separate sharing controls (e.g., one control flag for luma and one control flag for chroma). Each luma and chroma components may have its own palette table. This may be particularly useful for content with different degree of variations in the luma and chroma components. An exemplary pseudo code according to this embodiment is shown below for YUV color format, where a same sharing control flag is for the U and V component (i.e., palette_pred_UV), separate control flags may also be used.

```
If (palette_pred_Y)
Parse syntax book_index_Y
```

```
  Current CU palette[Y_index] = palette_book[book_index_Y]
     [Y_index]
Else
  Parse syntax num_major_color[Y_index]
  For (k<=KK, k>1, k--)
     palette_book[k][Y_index] = palette_book[k-1][ Y_index]
  End
  For (n <= num_major_color[Y_index])
     Parse syntax for current CU palette[Y_index][n]
     palette_book[0][Y_index][n] = current CU palette[Y_index][n]
  End
End
If (palette_pred_UV)
Parse syntax book_index_UV
  Current CU palette[U_index] = palette_book[book_index_UV]
     [U_index]
  Current CU palette[V_index] = palette_book[book_index_UV]
     [V_index]
Else
  Parse syntax num_major_color[U_index]
  For (k<=KK, k>1, k--)
     palette_book[k][U_index] = palette_book[k-1][U_index]
  End
  For (n <= num_major_color[U_index])
     Parse syntax for current CU palette[U_index][n]
     palette_book[0][U_index][n] = current CU palette[U_index][n]
  End
  Parse syntax num_major_color[V_index]
  For (k<=KK, k>1, k--)
     palette_book[k][V_index] = palette_book[k-1][V_index]
  End
  For (n <= num_major_color[V_index])
     Parse syntax for current CU palette[V_index][n]
     palette_book[0][U_index][n] = current CU palette[V_index][n]
  End
End
```

While the examples shown above always allow both the above CU and the left CU for the current CU to share their palette. However, it may also restrict to allow only one neighboring CU (only above CU or only left CU) to share the palette. Furthermore, while the examples demonstrate the granularity of palette coding and sharing on a CU basis, other granularity of palette coding and sharing may be used as well. For example, palette coding and sharing can be performed on prediction unit (PU) basis, coding tree unit (CTU) basis, CTU-row basis, or multiple CTUs basis.

While the first-in-first-out scheme is used in the pseudo codes for the fourth embodiment through the sixth embodiment for the "palette book" updating and ordering, other means can also be utilized as long as the encoder and decoder can perform the same process. For example, a counter can be used to keep track of the frequency of each palette set being selected for sharing. The palette book can then be updated according to the frequency, such as ordering them from high selection frequency to low selection frequency.

One aspect of the present invention addresses palette book management. When predictive coding is used for palette, the palette book needs to be updated according to the selection of palette for the palette-coded blocks, particularly during palette book reset and/or initialization. Since palette coding is utilized as a block coding mode (e.g., PU, CU or CTB mode), a straightforward palette management is to maintain palette data structure for each block (e.g., PU, CU or CTB). In this case, the stored palettes in previously palette-coded blocks have to be copied so that these palettes can be used by subsequent blocks for predictive coding as shown in FIG. 1. The stored palettes in previously palette-coded blocks have to be copied even for non-palette coded blocks. Such block-level palette management is inefficient since the copy operation has to be repeated for all blocks. When multiple palettes are used for the palette book, the coding time and power consumption may increase significantly.

Figure 2:
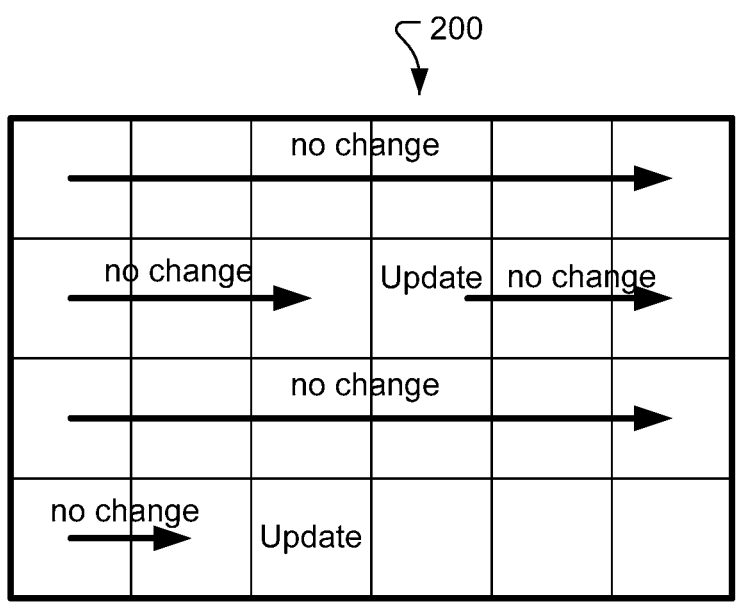
FIG. 2 illustrates an example of palette table management according to an embodiment of the present invention, where the palette table is stored in a higher level and may be shared by blocks in the same higher level.

In order to improve the efficiency of palette book management, embodiments of the present invention manage the palette book above a block level. For example, the palette book can be managed in the slice level and the palette book is initialized at the beginning of each slice as shown in FIG. 2. The thick-lined box 200 indicates slice boundaries. The first-in-first-out palette book updating process disclosed above may be used. The palette book is then maintained for each corresponding slice. When a palette-coded block in the slice needs to update the palette book, such as a new palette being used or some major colors in the palette being replaced, the stored palette will be modified accordingly. Otherwise, the stored palette book will simply stay unchanged, and there is no need to copy it from block to block.

Color table sharing can be extended to inter-component. Instead of sending an individual color table for each color component, embodiments of the present invention may share the same color table among different color components. For example, if the table sharing coding tool is turned on, N color tables can be sent and shared among color components, where N is an integer greater than zero. When N is equal to 1, only one color table is sent and multiple color components share the same table. Each component uses the shared color table directly or derived a new table from the shared table.

The inter-component color table sharing according to the present invention can be enabled or disabled at different coding levels to provide different levels of flexibility. The coding level may correspond to a transform unit (TU), a prediction unit (PU), a coding unit (CU), a coding tree block (CTB), a slice, a picture or a sequences level. For example, if a CU is major color coded (i.e., palette coded), a flag can be signaled for the palette coded CU to indicate whether the inter-component color table sharing is enabled or not.

As mentioned before, the color table for a non-palette coded block may share (i.e., reuse) the color table from the color table of the left block and the above block. When element-wise prediction is used for color table coding (i.e., palette coding), a first flag is used for every element to indicate whether the current element is equal to the collocated element of the color table of the left block. If not, another flag is used to indicate whether the current element is equal to the collocated element of the color table of the above block.

In another embodiment of the present invention, an improved palette coding is disclosed to remove the color table coding redundancy. The collocated element in the left color table and the collocated element in the above color table are compared. If they are the same, only one flag is required to indicate whether the current element is equal to the collocated element in the above color table or left color table.

Furthermore, in JCTVC-N-0247 (Guo et al., "*RCE*3: *Results of Test* 3.1 *on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-NO247), JCTVC-O-0182 and JCTVC-00218 (Guo et al., "*Evaluation of Palette Mode Coding on HM*-12.0+*RExt*-4.1", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-00218), the index map are signaled after the color table signaling. An embodiment of the present invention signals the index map first and uses the information by parsing the index map to encode other data. The information by parsing the index map can be the occurrence information. The information can be used to predict palette and reconstruct pixel value. In particular, the occurrence of major color in the coding unit can be derived by parsing the index map at the decoder side. After parsing the index map, the decoder can obtain the occurrence information of each major color.

The occurrence information can be used to predict palettes in color table and reconstruct pixel value. There are various ways to gather the occurrence information. For example, the occurrence information may correspond to the occurrence of major color in the coding unit. In another example, the occurrence information may correspond to the occurrence of miss predicted major color during index map coding.

Another aspect of the present invention addresses palette initialization for predictive palette coding. When predictive coding is used to code palette across different blocks, the previously coded/decoded palettes (palette book) are used as a predictor. However, certain blocks, e.g. the first palette-coded block in a slice/picture, may not have access to any previously coded/decoded palette. If reset mechanism is used, the first palette-coded block can refer the reset palette book. In the following, various initialization means are disclosed for the initialization of palette book.

Initializing to all zero. In this embodiment, at the beginning of each slice/picture, the palette in the palette book is all set to zeros for all colors table. As for the reset mechanism, i.e., reset palette at the beginning of a wavefront partition or a tile partition, or the beginning of each CTU row, the palette book is reset to all zeros.

Initializing to specific color values. In this embodiment, when initialization is needed (e.g., beginning of each slice/picture, beginning of each wavefront/tile partitioning, or beginning of each CTU row), specific values are assigned to the palette colors. For YUV video format, the U and V components contain much less variations and tend to concentrate around the mid-level (e.g. 128 for 8-bit format and 512 for 10-bit format). For example, color tables for U and V components can be initialized to values equal to or very close to the mid-level. As for the Y components, zero or the mid-level can be used for initialization. Furthermore, the specific values for initialization can be signaled or derived from high level such as Slice Header (SH), PPS or SPS.

Signaling specific color values in high-level syntax (HLS) various examples of HLS are disclosed as follows.

SPS

As mentioned earlier, the mid-level initialization will be particularly useful for YUV format. Thus, a high-level syntax indicating the color format of the sequence, such as a syntax element in the SPS, can be utilized to specify the usage of mid-level initialization for palette book. One exemplary pseudo code for HLS in the SPS level is shown as follows.

---

If (color_format_id in SPS == YUV)
    Palette initialization with mid-level
Else
    Palette initialization with Zero

---

The mid-level can be 128 for 8-bit format and 512 for 10-bit format.

PPS

Another embodiment example is to use PPS to specify the initialization values for palette book. This method is particularly useful for different scene settings in a sequence. For example, for pictures in a dark scene, the PPS can indicate to initialize the palette book with low values (e.g., 0 for completely dark). On the other hand, for pictures in bright scene, higher color values can be used for initialization. The exact values used for initialization can be explicitly signaled in the PPS.

Another way to assign the initialization values is to analysis the hue of the picture and to signal the initialization values corresponding to the dominant colors of the picture. In one example, when initialization of palette is needed for a portion of a picture (e.g., the beginning of slice, wavefront or tile), the specific initialization values derived or signaled in the corresponding PPS will be used.

Slice Header (SH)

In this example, the initialization values for each slice are signaled in the slice header. In the special case that each picture contains only one slice, this would be equivalent to using PPS. When there are multiple slices in a picture, a finer granularity of palette initialization value selection can be achieved with slice-header based specification. Syntax elements are added to the SH to indicate the specific values to be used for initialization of the palette book. The exact values can be determined in a similar as in the PPS case, e.g. by analyzing the brightness and/or the hue of the slice.

Figure 3:
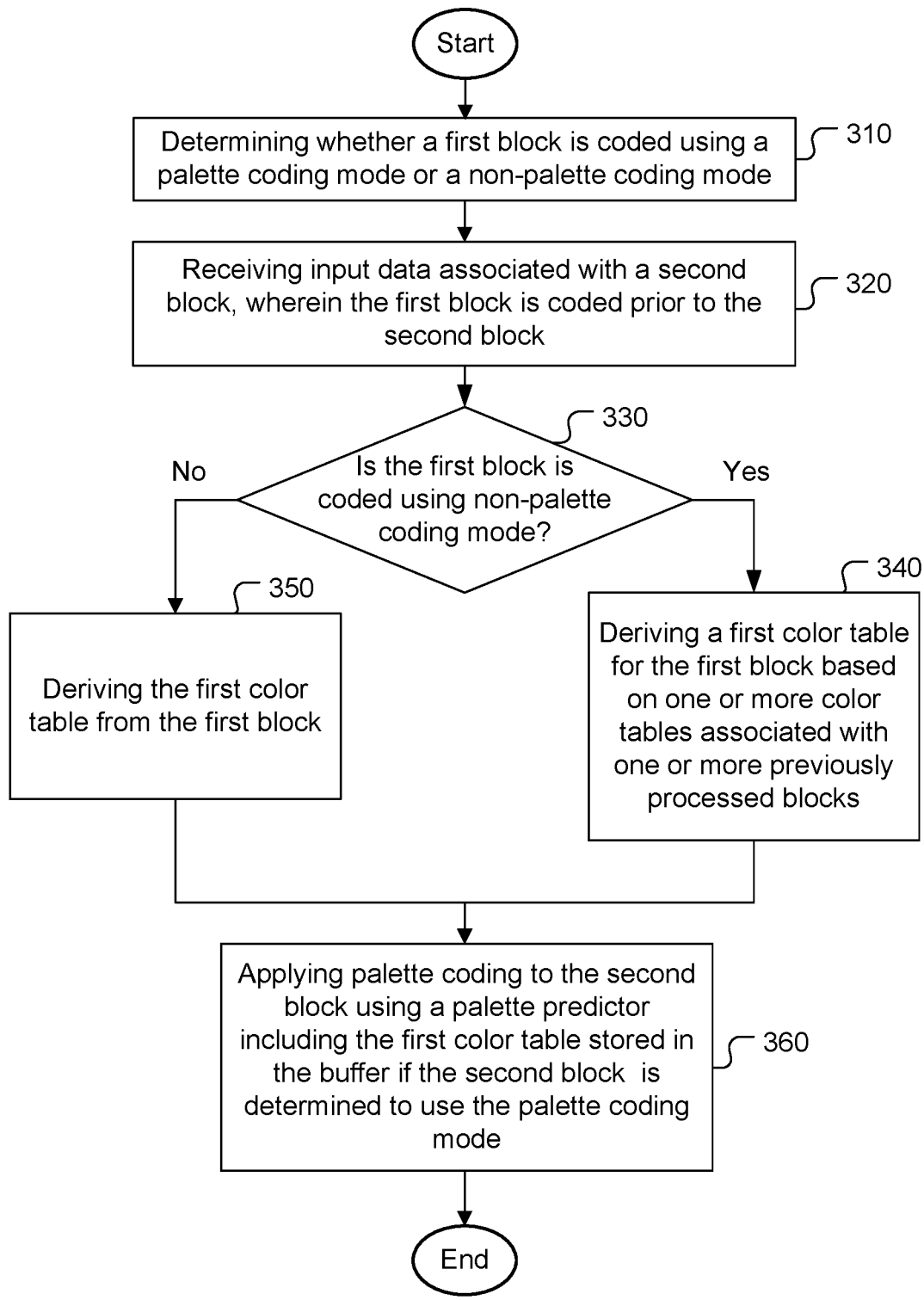
FIG. 3 illustrates an exemplary flowchart of an encoder system incorporating palette coding according to an embodiment of the present invention.

FIG. 3 illustrates an exemplary flowchart of an encoder system incorporating palette coding according to an embodiment of the present invention. The system determines whether a first block is coded using a palette coding mode or a non-palette coding mode as shown in step 310. Input data associated with a second block is received in step 320, wherein the first block is coded prior to the second block. The input data may be retrieved from memory (e.g., computer memory, buffer (RAM or DRAM) or other media) or from a processor. Whether the first block is coded using the non-palette coding mode is checked in step 330. If the result is "Yes", the step 340 is performed. If the result is "No", the step 350 is performed. In step 340, a first color table for the first block is derived based on one or more color tables associated with one or more previously processed blocks. In step 350, the first color table is derived from the first block. In step 360, if the second block is determined to use the palette coding mode, palette coding is applied to the second block using a palette predictor including the first color table stored in the buffer.

Figure 4:
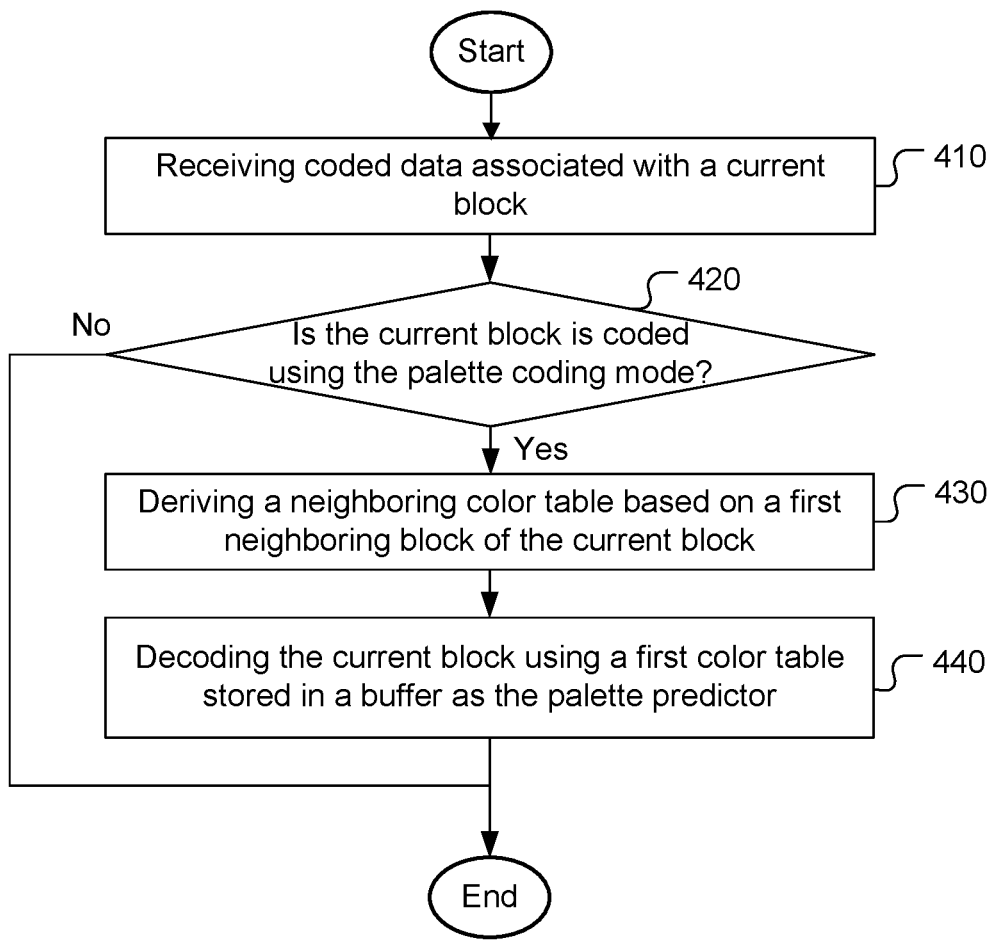
FIG. 4 illustrates an exemplary flowchart of a decoder system incorporating palette coding according to an embodiment of the present invention.

FIG. 4 illustrates an exemplary flowchart of a decoder system incorporating palette coding according to an embodiment of the present invention. The coded data associated with a current block is received in step 410. Whether the current block is coded in a palette coding mode or a non-palette coding mode is determined in step 420. If the result is "Yes", steps 430 and 440 are performed. If the result is "No", the process is terminated. In step 430, a neighboring color table is derived based on a first neighboring block of the current block. In step 440, the current block is decoded using a first color table stored in a buffer as the palette predictor.

Figure 5:
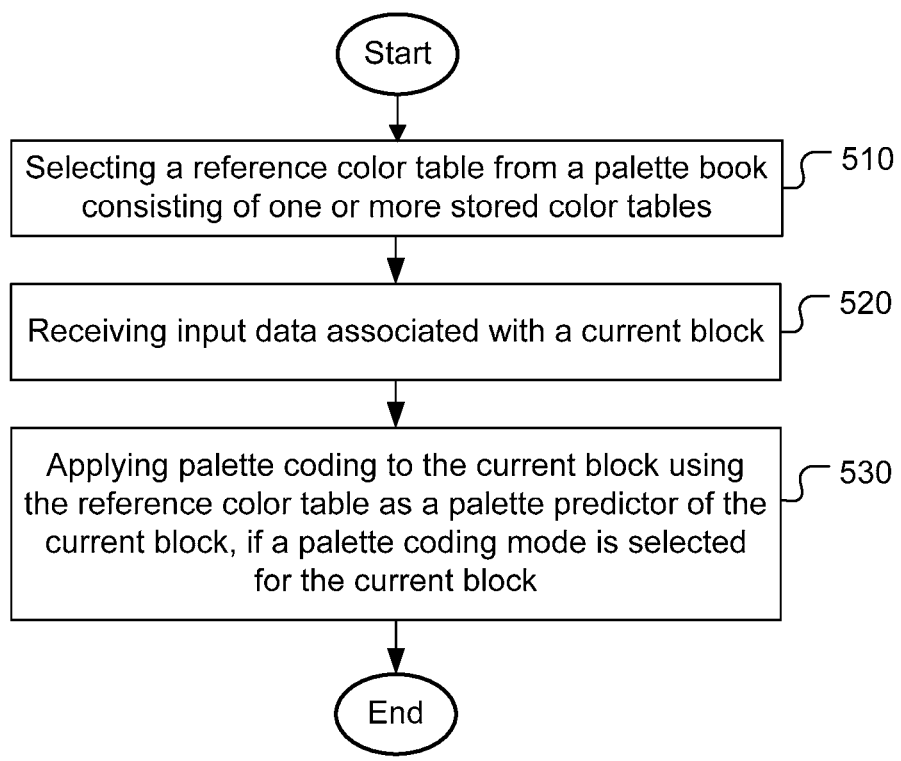
FIG. 5 illustrates an exemplary flowchart of a coding system using palette coding based on a reference color table according to an embodiment of the present invention.

FIG. 5 illustrates an exemplary flowchart of a coding system using palette coding based on a reference color table according to an embodiment of the present invention. A reference color table is selected from a palette book consisting of one or more stored color tables in step 510. Input data associated with a current block is received in step 520. Palette coding is applied to the current block using the reference color table as a palette predictor of the current block if a palette coding mode is selected for the current block as shown in step 530.

The flowcharts shown are intended to illustrate examples of palette coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding video data in a video coding system, the method comprising:
    for a first block that is coded using a palette coding mode,
        obtaining a first palette for palette coding the first block, and
        storing a first reference palette associated with the first block according to the obtained first palette;
    for a second block that is coded using a non-palette coding mode,
        setting a previously stored reference palette as a second reference palette associated with the second block;
    receiving input data associated with a third block, wherein the second block is coded prior to the third block; and
    when the third block is to be coded using the palette coding mode,
        deriving a third palette for palette coding the third block based on at least the second reference palette associated with the second block, and
        palette coding the third block using the derived third palette.

2. The method of claim 1, further comprising storing, in a buffer, one or more reference palettes respectively associated with one or more blocks processed prior to the second block.

3. The method of claim 2, wherein the one or more stored reference palettes stay in the buffer unchanged after encoding the second block.

4. The method of claim 3, further comprising:
    when the third block is to be coded using the non-palette coding mode, setting one of the one or more stored reference palettes as a third reference palette associated with the third block,
    wherein the one or more stored reference palettes stay in the buffer unchanged after encoding the third block.

5. The method of claim 1, wherein the second block is located at a left side of the third block.

6. The method of claim 1, further comprising:
    storing, in a buffer, one or more reference palettes respectively associated with one or more blocks processed prior to the first block; and
    storing the first palette in the buffer to update the one or more stored reference palettes.

7. The method of claim 1, wherein the second block and the third block are in a same coding tree unit (CTU) or in a same CTU row.

8. The method of claim 1, wherein the deriving the third palette for the third block comprises:
    deriving a palette predictor based on one or more stored reference palettes that include at least the second reference palette; and
    copying the palette predictor as the third palette of the third block on an entry by entry basis.

9. The method of claim 1, wherein the deriving the third palette for the third block comprises:
    deriving a palette predictor based on one or more stored reference palettes that include at least the second reference palette; and
    copying the palette predictor entirely as the third palette of the third block.

10. A method of decoding video data in a video coding system, the method comprising:
    receiving coded data associated with a first block and a second block;
    for the first block that is coded using a palette coding mode,
        deriving a first palette for palette coding the first block,
        decoding the first block using the first palette, and
        storing a first reference palette associated with the first block according to the derived first palette; and
    for the second block that is coded using a non-palette coding mode,
        decoding the second block using the non-palette coding mode, and
        setting a previously stored reference palette as a second reference palette associated with the second block.

11. The method of claim 10, wherein the deriving the first palette for palette coding the first block comprises:
   deriving a palette predictor based on one or more stored reference palettes; and
   copying the palette predictor as the first palette for the first block on an entry by entry basis.

12. The method of claim 10, wherein the deriving the first palette for palette coding the first block comprises:
   deriving a palette predictor based on one or more stored reference palettes; and
   copying the palette predictor entirely as the first palette for the first block.

13. The method of claim 10, wherein the first palette for the first block is stored in a buffer to update one or more reference palettes stored in the buffer.

14. The method of claim 10, wherein one or more reference palettes stored in a buffer stay in the buffer unchanged after decoding the second block.

15. The method of claim 14, wherein, when a next block to be decoded after the second block is coded using the non-palette coding mode, the one or more reference palettes stored in the buffer stay in the buffer unchanged after decoding the next block.

16. A method of coding video data in a video coding system, the method comprising:
   receiving input data associated with a first block and a second block;
   for the first block that is coded using a palette coding mode,
      deriving a first palette associated with the first block,
      palette coding the first block using the first color palette, and
      storing a first reference palette associated with the first block
   according to the derived first palette; and
   in a case that the current for the second block that is coded using a non-palette coding mode,
      coding the second block using the non-palette coding mode, and
      setting a previously stored reference palette as a second reference palette associated with the second block.

17. The method of claim 16, wherein the previously stored reference palette corresponds to a last coded palette.

18. The method of claim 16, wherein the deriving the first palette associated with the first block comprises:
   deriving a palette predictor based on one or more stored reference palettes; and
   copying the palette predictor as the first palette associated with the first block on an entry by entry basis.

19. The method of claim 16, wherein the deriving the first palette associated with the first block comprises:
   deriving a palette predictor based on one or more stored reference palettes; and
   copying the palette predictor entirely as the first palette associated with the first block.

20. The method of claim 16, further comprising:
   updating one or more reference palettes stored in a buffer by replacing an oldest one of the one or more reference palettes stored in the buffer with the first palette associated with the first block.

21. The method of claim 16, wherein
   the video coding system including a buffer storing one or more reference palettes, and
   the deriving the first palette associated with the first block is performed according to a selected reference palette from the one or more reference palettes that is identified by a book index.

22. The method of claim 21, wherein the book index has a smaller value for a more recently stored palette among the one or more reference palettes.

23. The method of claim 21, wherein the book index is inferred if the one or more reference palettes include only one reference palette.

24. The method of claim 20, wherein, when a next block to be encoded or decoded after the first block is coded using the non-palette coding mode, the one or more reference palettes stored in the buffer stay in the buffer unchanged after coding the next block.

* * * * *